United States Patent [19]

Zumbahlen, Jr. et al.

[11] 4,327,258
[45] Apr. 27, 1982

[54] METHOD AND APPARATUS FOR RAPID EVALUATION OF PARAMETERS AFFECTING VOICEBAND DATA TRANSMISSION

[75] Inventors: Louis H. Zumbahlen, Jr., Boulder Creek; Charles Volkland, Santa Clara, both of Calif.

[73] Assignee: Halcyon, Inc., San Jose, Calif.

[21] Appl. No.: 136,987

[22] Filed: Apr. 3, 1980

[51] Int. Cl.³ ............................................. H04B 3/46
[52] U.S. Cl. ........................... 179/175.3 R; 324/121 R
[58] Field of Search .................. 179/175.3 R, 175.2 R, 179/175.31 E; 324/57 DE, 57 N, 57 PS, 121 R, 73 R, 73 AT, 83 R

[56] References Cited

U.S. PATENT DOCUMENTS

| | | | |
|---|---|---|---|
| 3,814,868 | 6/1974 | Bradley | 179/175.3 R |
| 3,906,173 | 9/1975 | Bradley | 179/175.3 R |
| 3,956,601 | 5/1976 | Harris et al. | 179/175.3 R |
| 4,149,044 | 4/1979 | Hekimian et al. | 179/175.3 R |

*Primary Examiner*—Thomas A. Robinson
*Attorney, Agent, or Firm*—Lowe, Kokjer, Kircher, Wharton & Bowman

[57] ABSTRACT

An apparatus for measuring phase and amplitude jitter and simultaneously and audibly counting and monitoring transient excursions of two linear bar-chart type readouts calibrated in degrees and modulation percents and which are capable of displaying jitter measurements. The transient excursions in the form of phase hits, gain hits, drop outs and impulse noise are simultaneously counted in parallel registers and means are provided for visually indicating the cumulative real time count total of each register in numerical display. The method of evaluating parameters affecting voiceband data transmission includes simultaneously displaying phase and amplitude jitter components onto linear bar-chart displays and separately deriving the information for each of said displays and providing continuous and sequential illumination on each display encompassing the range of fluctuations from the jitter detectors.

34 Claims, 13 Drawing Figures

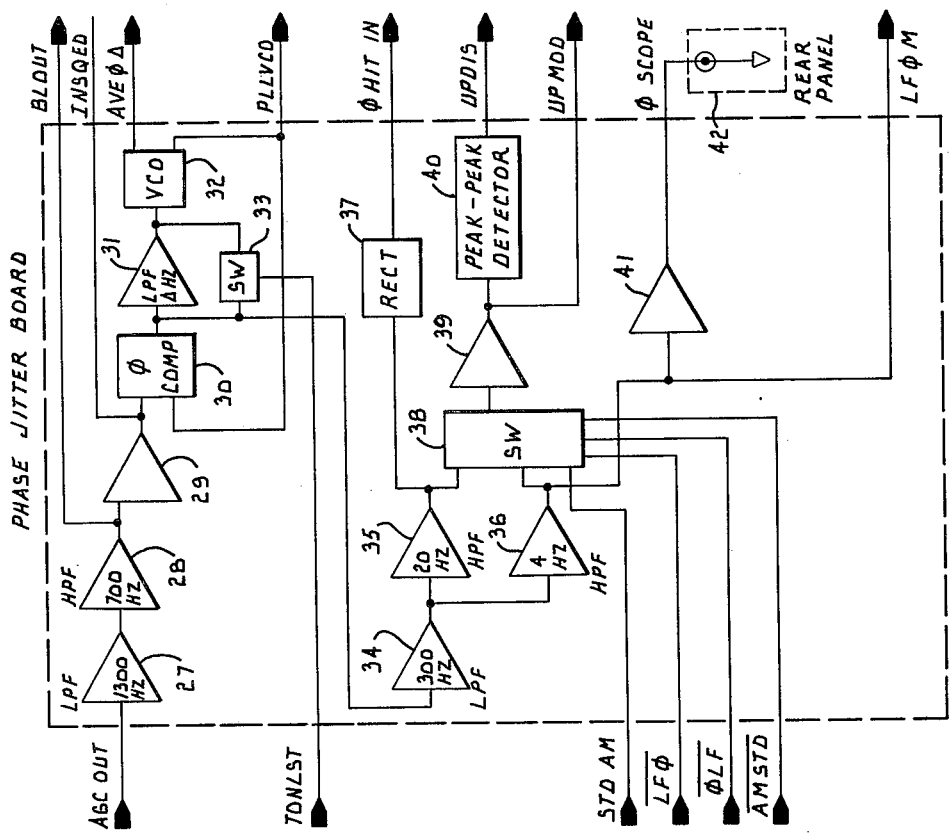

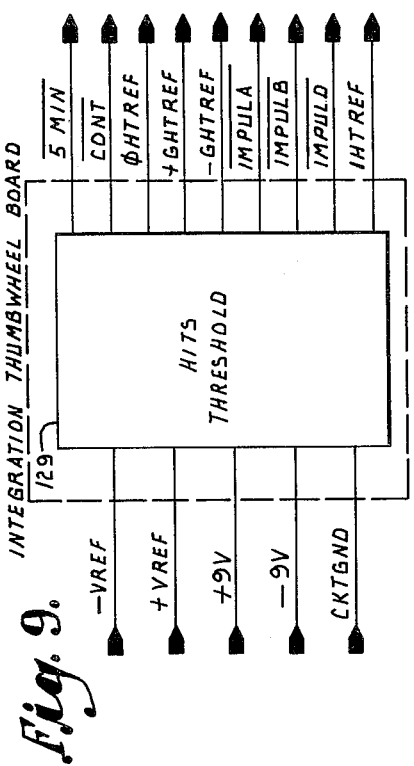
Fig. 9.
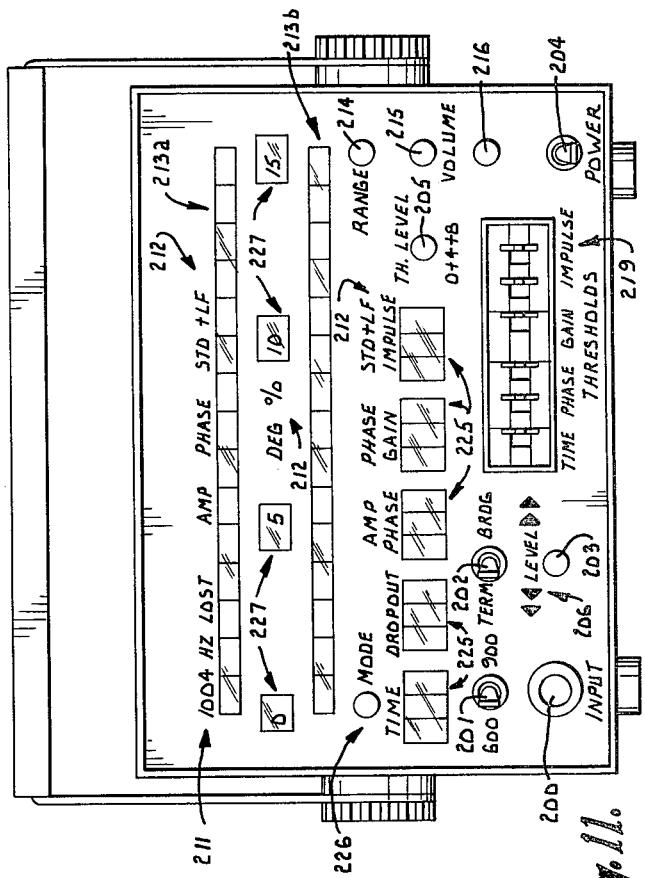
Fig. 11.
Fig. 1.

METHOD AND APPARATUS FOR RAPID EVALUATION OF PARAMETERS AFFECTING VOICEBAND DATA TRANSMISSION

BACKGROUND AND OBJECTS OF THE INVENTION

This invention relates to a portable test instrument capable of rapid evaluation of impairments that affect data transmission on the voiceband circuits.

The subject of impairments to nonvoice signals on common carrier telephone channels, both switched and dedicated, has been thoroughly described in the following Bell System Technical references:

PUB 41009 entitled "Analog Parameters Affecting Voiceband Data Transmission-Description of Parameters" October, 1971;

PUB 41008 entitled "Transmission Parameters Affecting Voice Band Data Transmission-Description of Parameters," July, 1974; and PUB 41009 entitled "Transmission Parameters Affecting Voice Band Data Transmission-Majoring Techniques" May, 1975.

Each signal format for nonvoice signals such as one or more tones, amplitude and/or phase modulated by either analog or digital information, is impaired to varying degrees by physical limitations, inevitable interferences, and design limitations. The subject invention will provide for the quick and efficient evaluation of impairments such as phase and amplitude jitter, both with and without low-frequency contribution and will simultaneously count phase hits, gain hits, drop outs and three levels of impulse noise.

For background information, incidental modulation has been defined as any unwanted AM, PM or FM imposed on the information carrying voiceband signal by a disturbing source other than itself.

Incidental modulation has been expressed in the above mentioned 1974 Bell System Technical references as the following summation:

$$V_r = A_O G(f_o)[1 + m(t)] \cos [2\pi f_o t + \phi(f_o) + \theta(t)] + n(t)$$

where
  $G(f_o)$ and $\phi(f_o)$ are the channel amplitude and phase characteristics respectively at frequency $f_O$,
  $n(t)$ is the total uncorrelated interference,
  $m(t)$ is incidental AM, and
  $\theta(t)$ is incidental PM [$d\theta(t)/dt$ is incidental FM]

As suggested above, this invention relates to a test instrument which measures phase and amplitude jitter and simultaneously counts phase hits, gain hits, drop outs and three levels of impulse noise. The phase jitter may therefore be defined as undesired phase modulation on a received signal and typically results from unwanted phase modulation on carriers supplied in carrier terminals. The modulating frequencies are often harmonics of 60 Hz or other very low frequencies that are not easily filtered in power supply circuits. In making phase jitter measurements, the normal procedure is for a holding tone to be transmitted over the facility under test. The phase jitter measured at the receiver is the summation of any incidental phase modulation and random or quantized noise encountered on the facility. Actually all AC components of incidental phase modulation, which cause the zero crossings of a voice-band signal to "jitter" are measurements of interest.

Incidental amplitude modulation or amplitude jitter on a telephone channel takes the form of low index double side band modulation of voice band signals.

Finally, phase hits, gain hits and drop outs are phenomena which can be classified as abrupt changes in the phase or amplitude of a received sinusodial wave and which occur so infrequently, or exist for such short periods of time, that they cannot be properly assessed by any other known techniques. Known prior art instruments which have been used to measure gain and phase hits, as the rapid gain and phase changes are usually called, do so by monitoring the magnitude and phase of a sinusodial tone. Hits are usually recorded and accumulated on electromechanical counters with adjustable threshold levels.

Drop outs are short interruptions in service where the transmitted signal experiences the sudden large drop in power wherein the signal often becomes undetectable.

As has been described in the Bell System Technical Reference entitled "Analog Parameters Affecting Voiceband Data Transmission-Description of Parameters," October, 1971, there are suggested designs for instruments capable of measuring both phase jitter and incidental amplitude modulation. For example, the recommended design of phase jitter instruments includes the processing of a received voice frequency tone as follows:

1. Band limit around a carrier frequency (nominally 1010, ±300 Hz).
2. Amplify and amplitude limit the carrier to strip off the A.M.
3. Detect zero crossings jitter from the error voltage of a phase lock loop.
4. Display filtered jitter (up to about 300 Hz) on a peak-to-peak indicating meter.

Since incidental AM or amplitude jitter is low index and only small peak-to-peak excursions of the carrier are evident, it may become different to observe by an oscilloscope or envelope detection and to further distinguish means from additive uncorrelated interference. Accordingly, the suggested instrumentation of amplitude jitter detection and metering is similar to that for incidental phase modulation or phase jitter, and includes the process of band limiting and removal of other interfering modulation. A true peak detector, which when used in conjunction with an accurately controlled oscillator in a feed back loop, would then be capable of detecting only amplitude modulation on the carrier tone.

Known prior art instruments are generally designed along the line outlined above and in the above Bell System Technical References. Such instruments have further been disclosed in the two patents to Frank R. Bradley, U.S. Pat. Nos. 3,814,868 and 3,906,173, entitled "Telephone Line Characteristic Measuring Instrument" and "Telephone Line Characteristic Measurement Instrument and Display," respectively. The known patented devices generally utilize the Bell System approach, or parts thereof, and incorporate an oscilloscope for identifying the source of disturbance, e.g. either amplitude modulation or phase modulation, phase hits or white noise, etc. but require a relatively sophisticated ability to interpret the oscilloscope trace both in terms of type and quantity measurement.

The subject invention is designed to provide for the rapid elevation of impairments in that it will measure phase and amplitude jitter, both with and without low frequency contributions and simultaneously count phase hits, gain hits, drop outs and three levels of impulse noise. Phase and amplitude jitter are displayed on two linear bar-chart type readouts that are calibrated in degrees and modulation percent. Phase hits, gain hits, drop outs and impulse noise are counted simultaneously in parallel counting registers and the cumulative real time count total of each register is displayed on individual three digit numerical displays. The linear bar-chart displays are designed to indicate jitter in three combinational operating modes. They are:

(1) Phase jitter and amplitude jitter (both standard plus low frequency);
(2) Phase jitter and comparison of standard and standard plus low frequency; and
(3) Amplitude jitter in comparison of standard and standard plus low frequency.

To amplify briefly on the above, and considering mode number 1, the basis of both display readings is "standard plus low frequency." Thus, all jitter components in the 4 to 300 Hz range are measured. The upper display on the front panel of the instrument indicates phase jitter in degrees, peak-to-peak and the lower display indicates amplitude jitter in "equivalent degrees," peak-to-peak. By definition phase jitter measurements indicate the cumulative effect of incidental (true) phase modulation and additive tones or noise on zero crossings of a holding tone. Similarly, amplitude jitter includes both incidental amplitude modulation, plus the effect of additive tones or noise on the peak-to-peak value of the holding tone. It has been seen that there is little evidence of incidental amplitude modulation in a telecommunication facility, therefore a reasonable assumption can be made that the amplitude jitter display normally will show only the effect of additive tones or noise present on the circuit. If the two readings (upper and lower displays) are approximately equal, the problem is therefore likely to be single-frequency interference or noise since both equally affect phase and amplitude. On the other hand, a large phase-jitter reading combined with a small amplitude-jitter reading typically indicates the presence of both noise and incidental phase modulation. The noise component is responsible for the amplitude jitter reading and an equivalent portion of the phase jitter reading. In this case, the difference between the two readings is caused by pure phase modulation.

In mode 2, mentioned above, the contributions of low frequency phase jitter is identified. The upper display shows jitter components in the "standard" (20–300 Hz) range. The lower display shows jitter components in "standard plus low frequency" (4–300 Hz) range. Differences in the two readings are therefore directly attributable to low frequency phase jitter.

Mode 3 or amplitude jitter provides the same capability for isolating low-frequency amplitude jitter components. In this case both displays are calibrated in percent modulation. The upper display measures "standard" and the lower display measures "standard plus low frequency" components. As indicated above, the low incidence of true amplitude jitter will typically result in little variation between the two displays.

In addition to the above, the unit includes a unique audio monitoring scheme and an auxiliary output which permits the instrument to be interconnected with the X and Y deflections of an ordinary oscilloscope.

An object of the subject invention is to provide a new and improved method and telecommunication test instrument that is easy to read in that it is capable of displaying dynamic information yet at the same time retains certain advantages of digital computation.

Another object of this invention is to provide a method and unique telecommunications test set of the character described, a digital technique for accumulating phase and amplitude jitter; however, presenting such information in an analog type display.

A further object of the invention is to provide a method and unique telecommunication test set wherein certain related signals are visually compared so that the test instrument operator may see in "real time" the impairments of signal phenomena relative to each other. For example, by observing signal fluctuations simultaneously it is possible to determine whether the impairments are occurring in the low frequency (4 to 20 Hz) portion of the jitter spectrum or in the standard (20 to 300 Hz) frequency range. Accordingly the problem of visually detecting whether or not fluctuations and excursions are random in only one mode has been obviated and the simultaneous visual comparison of both modes provides meaningful information.

A still further object of the invention is to provide a unique telecommunication test set that provides for the simultaneous and separate display of phase hits, gain hits, drop outs and impulse noise. In this manner the instrument operator may visually observe excursions or perturbations on either of the linear bar-chart displays and immediately determine whether the perturbation was classified as a phase hit, a gain hit, a dropout or as impulse noise.

A further object of the invention is to provide a telecommunication test instrument of the character described immediately above which is coupled with an audio output capable of identifying some, or all, of the impairments (excursions, perturbations etc.) by the character of the sound emanating therefrom.

A further object of the invention is to provide a telecommunications test instrument having a unique display that is capable of facilitating the comparing of noise and making a determination of whether or not the impairment is noise or phase jitter. For example, if the linear bar-chart type display utilized herewith indicates equal magnitudes of both amplitude jitter and phase jitter, the instrument user can assume that the impairment is due to noise and not to incidental phase modulation.

A significant and important object of the invention is to provide a simplified and easy to read meter type instrument that requires a minimal amount of training for operation and diagnosis of impairments on voice bands of telephone circuits.

A further object is to provide a unique apparatus for converting digital information into an inertialess analog type display.

Other and further objects of the invention, together with the features and novelty appurtenant thereto, will appear in the course of the following description.

DETAILED DESCRIPTION OF THE INVENTION

In the accompanying drawings which form a part of the specification and are to be read in conjunction therewith and in which like reference numerals are used to indicate like parts in the various views:

FIG. 1 is a combination schematic and block diagram of the receiver circuit of the telecommunication test set;

FIG. 2 is a combination schematic and block diagram of the phase jitter circuit thereof;

FIG. 7 is a block diagram of the events counter circuit;

FIG. 9 is a block diagram of the integration thumb wheel switch circuit and inputs and outputs associated therewith;

FIG. 11 is the front elevational view of the telecommunications test set; and

Figure 4:
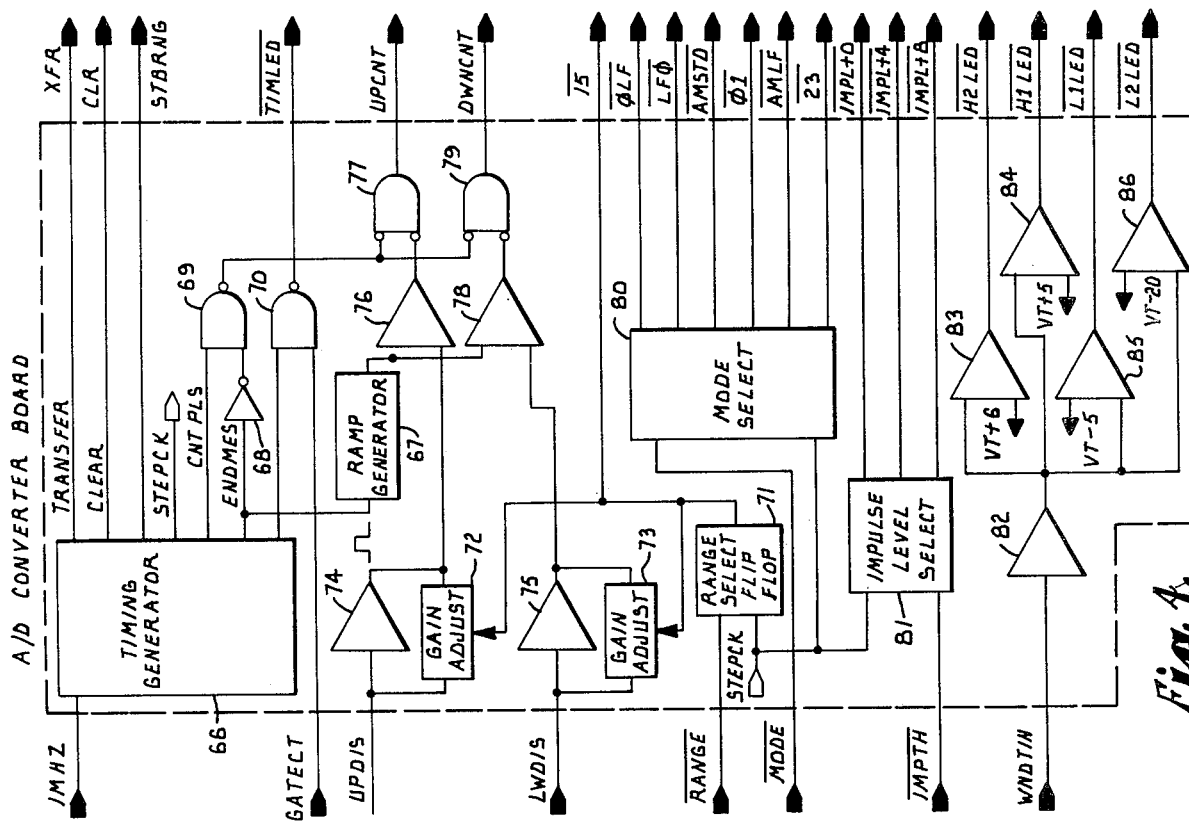
FIG. 4 is a combination schematic and block diagram of the analog digital converter circuit.

Turning now more particularly to the drawings and initially to FIG. 11, a front panel mounted jack 200 is provided in the lower left hand corner thereof and is WECO 310 plug compatible. This input jack provides a connection means for this instrument with the circuit under test and to receive the 1004 HZ holding tone level with the input measurement circuitry which is balanced and interfaced therewith. A switch (of the toggle variety) 201 is used in conjunction with switch 202 (the term/brdg) to provide either a 600 ohm or 900 ohm input impedance for terminated measurements. Most 4-wire circuits are tested using the 600 ohm position; however, 2-wire subscriber loops are typically tested using the 900 ohm position. The toggle switch 202 controls the impedance of the input measuring circuitry in that the term position corresponds to the impedance of either the above mentioned 600 or 900 ohms depending on the position of the switch 201. When switch 202 is in the brdg position, the impedance is increased to a value greater than 20,000 ohms to facilitate bridging-type measurements on circuits that are already terminated.

A potentiometer 203 is located on the front panel of the test instrument for conditioning input measuring circuitry to accomodate an input test tone range of +10 dB to −40 dB. An internal AGC (discussed, infra) will accomodate a signal range of +6 dB to −14 dB without further readjustment of this particular control. Toggle switch 204 controls the application of primary power to the unit. Other portions of the test instrument will be discussed in conjunction with the appropriate circuitry.

FIG. 1 discloses the receiver board circuitry and shows at the upper left hand corner thereof two inputs designated as RCV-TIP and RCV-RNG. These "tip and ring" inputs are directly from the front panel jack 200 and are inputted through the input impedance circuitry designated as TERM which determines whether the input impedance is the above mentioned bridging (greater than 20 kilohms) 600 ohm termination or 900 ohm termination and is from thence delivered through transformer T.

The output of transformer T is buffered through buffer 10 and then applied to amplifier 11. The output of amplifier 11 goes off the board at the output terminal indicated as receive out (RCVOUT). This signal goes to the level potentiometer 203 on the front panel (FIG. 11) where the signal is attenuated and brought back to the terminal marked GBIN at the lower left hand corner of the receiver board circuitry. The GBIN attenuated signal is applied to amplifier 12 with a 40 dB gain and is taken via line 12a to the AGCIN output from the receiver board circuitry and will eventually be delivered to the AM jitter board circuitry in FIG. 3, which will be discussed later. The output of amplifier 12 is also delivered to a full wave rectifier 13 and used in the "drop out" circuitry. The output of rectifier 13 is delivered to a 500 Hz Bessel low pass filter 14 with one output of same on line 14a going to the output terminal indicated at WNDTIN, which is used to set up certain level indicators on the front panel shown in FIG. 11. The other output is delivered to comparator 15 where it is compared with the level indicated as VT 2. This signal is inverted by inverter 16 and taken into NOR-gate 17 to determine one half of the "drop out" characteristics which will be discussed later.

Returning once again to amplifier 11. Its output is also applied to a C message weighting filter 18. This filter 18 has an output applied to a 3 section 1010 Hz notch filter which shall be referred to by the numbers 19, 20 and 21. The inputs to the 1010 Hz notch filter are NOIN, ST2IN and ST3IN with the outputs being referred to as ST1OUT, ST2OUT and NOTCH. These signals are utilized strictly for tuning purposes and are not a part of the system operation. In any event after the output of the C message weighting filter 18 has been filtered through the 1010 notch filter it goes into a 10 dB gain setting circuit 22 and from thence to a rectifier 23. The output from the rectifier circuitry 23 is then delivered to the output terminal identified as INPNOS which is the output and associated circuitry used to measure impulse noise. Another rectifier 24 is in parallel with the input to the 10 dB gain setting circuit 22. This rectifier 24 is used for the second half of the "drop out" circuit with the output of the same being fed through another 500 Hz bessel low pass filter 25 having essentially the same characteristics as the filter 14. The output of filter 25 then goes into another level detector 26 which compares the level thereof with another reference VT1 with its output being fed into the NOR-gate 17.

For purposes of clarification, a drop out is a determination that if the appropriate signal level drops 12 dB below the nominal level which is determined by the front panel pot 203 and circuit elements 12, 13, 14, 15 and 16, a drop out is appropriately indicated. Likewise, if the level drops and is replaced by white band noise of an equal level which is determined by the circuit elements 24, 25 and 26 the instrument is required to indicated a "drop out" and accordingly the NOR-gate 17 is utilized for that purpose with the output of same being shown in the lower right hand corner as $\overline{\text{DROPOT}}$.

As mentioned above, the receiver board includes an AGCIN output therefrom. This AGC output is transmitted to the AM jitter circuit board (FIG. 3) and has an output therefrom designated as AGCOUT.

For purposes of continuity, the next circuitry to be discussed in detail will be the phase jitter circuit board or FIG. 2. This circuit board has as its primary input the AGCOUT signal (from the Am jitter board) shown as entering on the upper left hand portion thereof. This input (the AGCOUT) is initially directed to a 1300 Hz low pass filter 27 and from thence to a 700 Hz high pass filter 28. This sets the plus and minus 300 Hz weighting for the phase jitter measurements since the Bell System defines phase jitter components as being those only up to ±300 Hz from the main frequency. One output of the 700 Hz high pass filter goes off the board at the terminal BLOUT in the upper right hand portion of the figure and will go back to the AM jitter board FIG. 3. The other output from the high pass filter 28 goes to the level comparator 29 which operates to compare the output of filter 28 to ground to create zero crossings. The output of this zero crossing detector (29) goes out of the phase jitter circuitry at the output marked INSQED which essentially means "input squared" and is used for board and system testing and not in system operation. However, the output of the zero crossing detector 29 also goes to phase comparator 30 with its output being directed to a 4 Hz low pass filter 31 and from thence to a voltage controlled oscillator (VCO) circuit 32. A switch 33 is connected in parallel with the low pass filter 31 and is used to modify the characteristics of the filter to decrease the lock up time and to increase the dynamic range of the filter. In this manner filter lock up is accomplished much quicker.

The VCO 32 has two outputs therefrom. One output is designated as AVE$\phi\Delta$. The second output is designated as PLLVCO which is the designation for phase lock loop VCO. This phase lock loop VCO signal is likewise fed back into the phase comparator 30 for the other leg of the phase comparison function.

Figure 6:
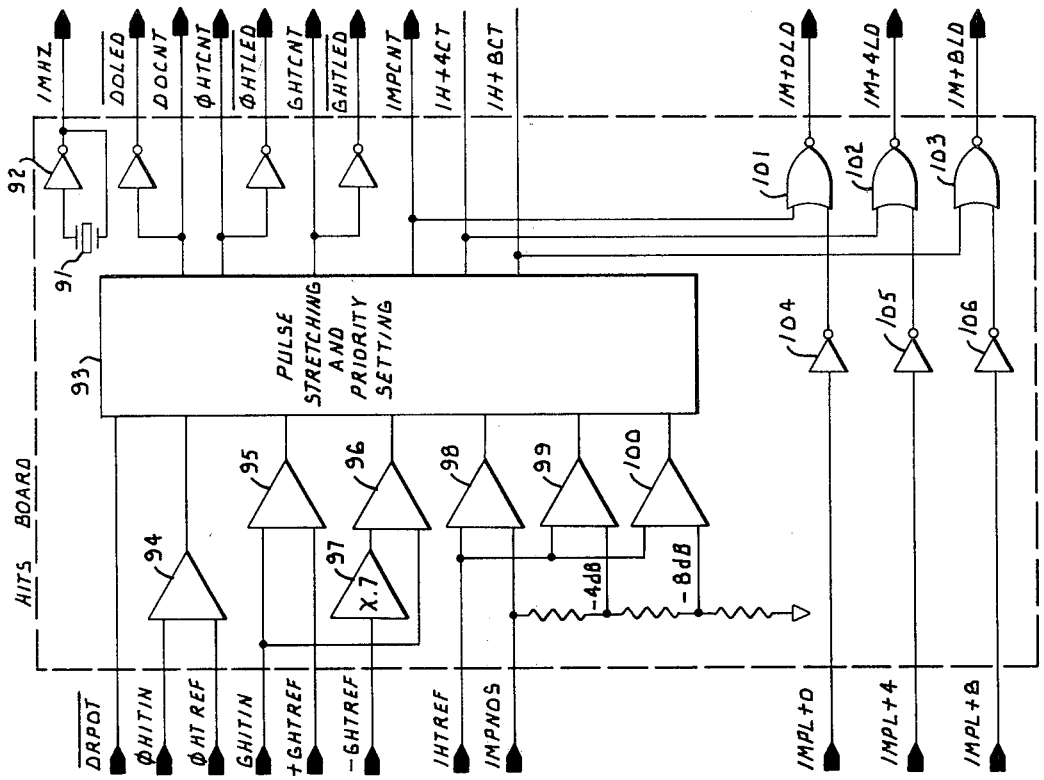
FIG. 6 is a block diagram of the hits circuit.

The output of the phase comparator 30 is likewise directed to the 300 Hz low pass filter 34 that is providing the filtering for the 300 Hz weighting that applies to the definition for phase jitter. The output from the filter 34 is directed to two high pass filters, a 20 Hz high pass filter 35 and a 4 Hz high pass filter 36. These filters define the standard which is 20 Hz and the low frequency which is 4 Hz for the lower end of the jitter weighting. The output from the standard high pass filter 35 then goes into rectifier 37 which will be used for measuring phase hits and which has an output $\phi$HITIN that is eventually applied to the hits board (FIG. 6).

The other output from the standard high pass filter 35 is directed to a FET switch 38. The FET switch 38 also has other inputs thereto which are to low frequency phase jitter out of the high pass filter 36 and also a signal entitled STDAM (coming from the AM jitter board) which is standard amplitude modulation and then 3 control lines thereto which are designated as $\overline{LF\phi}$, $\overline{\phi LF}$, and $\overline{AMSTD}$. These three lines control which of the three signals will be displayed on the upper display of the control panel that is shown in FIG. 11.

The output of the switch 38 then goes into a buffer 39 and from thence to a peak-to-peak detector 40 and thereby providing the signal for the upper display designated as UPDIS which will eventually be delivered to the A to D converter circuit board (FIG. 4). A second output from the buffer 39 is designated as UPDMOD and is used for tuning purposes only and is shown as output from FIG. 2 on the left hand side thereof. This term is a shorthand designation for upper display modulation.

The output from the 4 Hz high pass filter 36 is shown as exiting from the FIG. 2 phase jitter circuit board at the terminal LF$\phi$M and is eventually delivered to the AM jitter board and used on the lower display. A buffer 41 is also provided on the output of the 4 Hz high pass filter 36 and is indicated as being delivered to the terminal $\phi$ scope which is an indication that the output therefrom may be used with oscilloscope jacks 42 that are located on the rear panel of the test instrument. Finally, the terminal designation LF$\phi$M designates a low frequency phase modulation output and is used for system test only.

Figure 3:
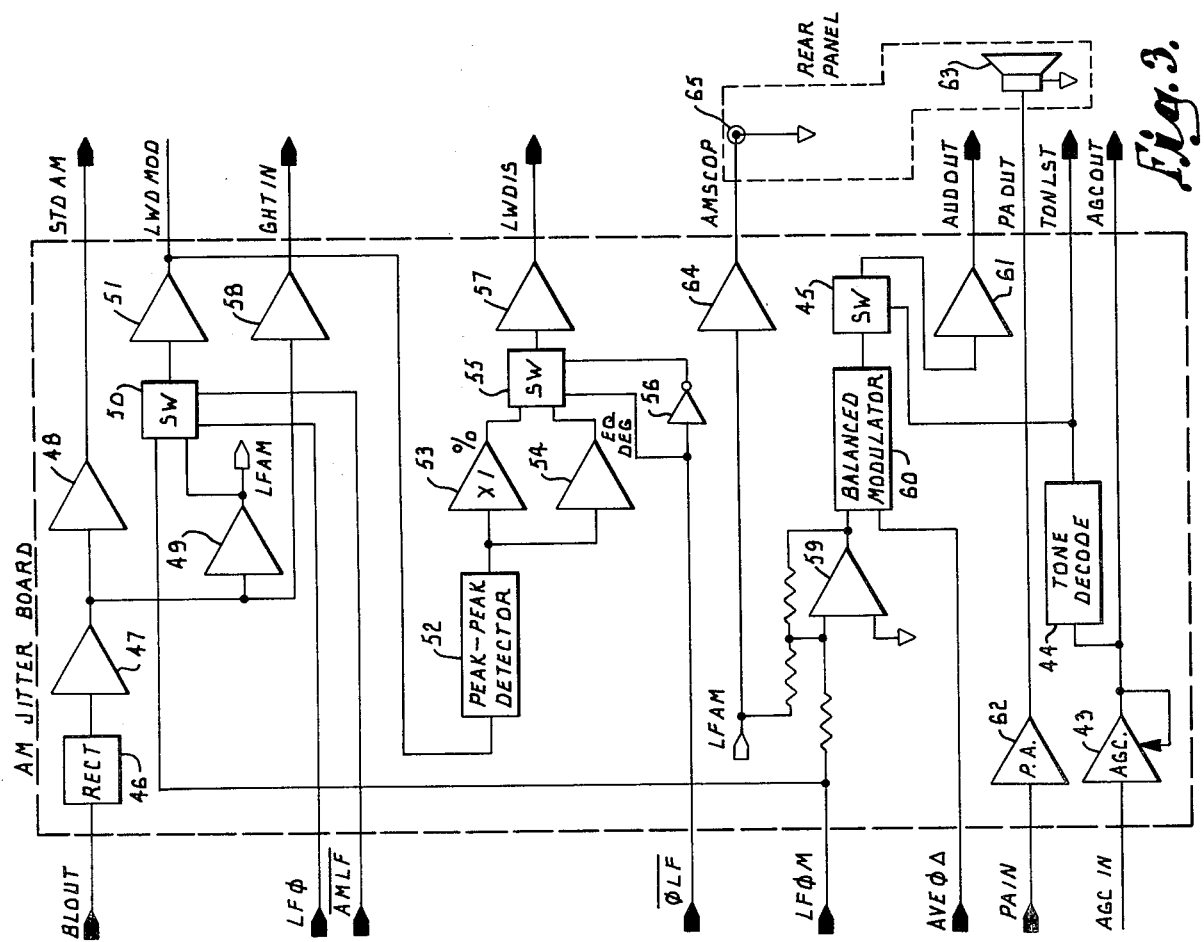
FIG. 3 is a combination schematic and block diagram of the amplitude modulation (AM) jitter circuit.

Referring now to FIG. 3 (the AM jitter circuit board) the AGC IN output from the receiver board is received in the lower left hand corner of the figure and is initially delivered to AGC amplifier 43. The output from the AGC amplifier is fed to the output terminal and back to the phase jitter board for tone weighting. This output is designated as AGC OUT and is shown in the lower right hand corner of FIG. 3. The output from AGC amplifier 43 also goes to the tone decoder 44 with its output being shown as the output terminal TONLST or tone lost and which is used to drive the transistor switch 33 (modifying the phase locked loop associated therewith) on the phase jitter circuit board on FIG. 2. The tone decode output from circuit 44 is also used in conjunction with switch 45 which will be discussed in more detail, infra.

The output signal AGC OUT is the input to the phase jitter board on FIG. 3 and which is outputted from the 700 Hz high pass filter 28 at the output indicated as BL OUT indicating band limiting out. This signal is delivered back to the AM jitter circuit board on FIG. 3 at the upper left hand corner thereof. The band limited signal is initially rectified in the full wave rectifier 46 and then fed into a low pass filter 47 which is a 300 Hz cutoff filter. The output of the low pass cutoff filter 47 is delivered to three high pass filters 48, 49 and 58. Filter 48 is a 20 Hz cutoff filter having an output designated as STDAM which is then delivered to the phase jitter board for measurement (the STDAM designates standard amplitude modulation).

As suggested above, the output from the filter 47 likewise is delivered to the 4 Hz cutoff high pass filter 49 which outputs the signal to switch 50. Switch 50 has two inputs shown also in the upper left hand corner of FIG. 3. One input is designated as LF$\phi$ which is the low frequency phase modulation from the phase jitter circuit board with the other input being the AMLF which is the inverted amplitude modulation low frequency. The switch (50) is selected by either one of the two input signals (either LF$\phi$ or AMLF) with the output of the switch being buffered at 51 and exited in the upper right hand corner of the circuit indicated as LWDMOD or lower display modulation that is used for test only. The output likewise is delivered to the peak-to-peak detector 52 and from thence is taken into the two amplifiers 53 and 54. As shown in FIG. 3, amplifier 53 has the X1 sign therein and a % associated therewith while amplifier 54 has X1.15 and the designation EQDEG. The purpose of these amplifiers is to equalize the display characteristic. Since amplitude modulation is normally measured in percent, and when in the comparison mode including amplitude jitter and phase jitter, a weighting factor of 1.15 is applied so that amplitude modulation may be measured in what is called equivalent degrees. Ordinarily a single interference tone 20 dB down from the fundamental holding tone will give 11.5 degrees of phase jitter and will likewise result in 10% amplitude jitter. However, this is accounted for by the weighting factor of 1.15 in the amplifier 54 so that when comparing the two on the phase jitter and amplitude jitter mode, the instrument will show 11.5 equivalent degrees on the amplitude jitter display or substantially the same reading on both displays. In any event the output of the two amplifiers are fed to switch 55, same having two other inputs that being the $\phi$LF and $\phi$LF inverted. As shown in FIG. 3 the $\overline{\phi LF}$ not signal is inputted to 1 terminal of switch 56 while the inverter 56 inverts the signal and applies same to the other input terminal of switch 55. The output of the switch 55 then goes to buffer 57 and on to become the LWDIS which is the lower display signal and which will eventually be delivered to the A to D converter board for the lower display.

As mentioned above with respect to the outputs of the amplifier 47, a third high pass filter 58 is utilized therewith. This high pass filter has an output GHTIN (gain hit in) outputting from the upper right hand portion of FIG. 3 and is a signal that is processed to determine whether or not gain hits have occurred.

The circuit input LFφM is delivered to one side of a summing amplifier 59. This designation represents low frequency phase modulation. The output of the amplifier 59 is summed with the low frequency amplitude modulation signal (LFAM) with the two signals being delivered to the balanced modulator 60 in conjunction with the signal designated AVEφΔ. The balance modulator 60 is used for tone production in that the average triangular wave input on one side and the modulation (the sum of the phase and amplitude modulation) and create a double banded suppressed carrier signal which is fed into switch 45, amplified in amplifier 61, and sent out on the terminal indicated as AUDOUT (audio out) in the lower right hand portion of FIG. 3. Switch 45 operates to disable the tone if a 1004 Hz input is not received. The audio output signal (AUDOUT) is delivered to the front panel board and to the volume potentiometer. The output of the volume potentiometer comes back to the AM phase jitter board (FIG. 3) as the signal indicated PAIN (power amplifier input). This power amplifier input is amplified by power amplifier 62 and is shown as being outputted to signal PAOUT (power amplifier output) and eventually to a speaker 63 on the rear panel of the test instrument.

Another terminal in the left central portion of FIG. 3 (LFAM) is the low frequency amplitude modulation signal. This signal is delivered to the buffer 64 and represents the low frequency phase modulation that is amplified and taken for the scope output on the back designated as 65.

FIG. 4 shows the A to D converter board and has a 1 MHz square wave input from a crystal controlled generator delivered to the upper left hand portion thereof.

This 1 MHz square wave comes from the hits board discussed, infra. Initially the 1 MHz signal is delivered to the timing generator 66 which provides the timing signal required for conventional analog to digital conversion. The timing generator is comprised of a divider string where the 1 MHz signal is eventually divided down to a 100 Hz signal and certain ones of these signals are summed together to set up the 100 millisecond timing window used for transfer and clear. Also a one KHz strobe range signal is shown exiting the timing generator 66 on the output terminal in the upper right hand corner of FIG. 4 identified as STBRNG. This strobe range is used to debounce the front panel push buttons and set up the timing required for A to D ramping and other control features required by the digital section of the circuitry.

Another output from the timing generator is the signal identified as ENDMES which indicates end measure. This output is delivered to the ramp generator 67 which generates a linear ramp for the A to D converter. It is also delivered to the inverter 68, the output of which is summed at the 69 (AND-gate 69) with a CNTPLS signal (count pulse). As a design technique the counters used in this system require one more count after a timing period closes for the information to transfer to the output. Accordingly after the end of measurement interval another count is gated into the counters to transfer the data.

The signal designated as GATECT goes high when the hits functions are enabled (for a continuous 5 or 15 minute count). This signal is clocked with a signal from the timing generator to flash the time LED through the AND gate 70 to the output labeled TIMLED.

A signal from the front panel identified as the input RANGE (from a push button the front panel) is inputted to a range select flip flop 71. The range signal results from a momentary switch which allows the range on the linear bar-chart display to be changed from 15° (%) full scale to 30° (%) full scale as will be discussed, infra. Further, a step clock signal (STEPCK) signal is likewise inputted to the range select flip flop. The step clock is used for debouncing purposes. When the front panel push button is appropriately actuated the range signal is gated into the flip flop so that it changes states allowing it to be driven by the step clock signal for the debouncing function. The output of the range select flip flops 71 is the output terminal indicated as $\overline{15}$. The output also is delivered into a gain adjust circuit 72 and a similar circuit 73. An upper display signal (UPDIS) is delivered to amplifier 74 with the gain adjusted around same by the circuit 72. This (circuit 72) is a times 2 multiplier which is capable of functioning to change the DC voltage from 30° (%) to 15° (%) full scale. The lower display (LWDIS) is inputted into amplifier 75 where the gain is adjusted by the gain adjust circuit 73 in a manner similar to the above mentioned times 2 multiplier which is used for the 30/15 gain relationship. The outputs of the amplifier 74 is fed into a comparator 76 with the ramp generator 67 output being delivered to the other side of the comparator (76). The comparator output is then delivered to an AND-gate 77 which also connects with the AND-gate 69 so that pulses from the ramp generator are allowed to pass therethrough with the occurrence of the extra pulse from the gate 69 as suggested above. This AND-gate output (from 77) is designated as UPCNT or the upper count.

The output from the amplifier 75 is delivered to comparator 78 with its other input being fed from the ramp generator 67. Similarly the output of comparator 78 is delivered into the AND-gate 79 which is gated with the extra pulse from gate 69 for the down count (DWCNT) output.

As will be seen with respect to the front panel in FIG. 11, a momentary switch thereon permits the selection of three different combinational modes for display on the dual linear bar-chart displays. These modes are:

Mode 1, a comparison of phase jitter (degrees) and amplitude jitter (equivalent degrees) both standard plus low frequency;

Mode 2, phase jitter in degrees, peak-to-peak (comparison of standard and standard plus low frequency); and Mode 3 amplitude jitter and percent modulation (comparison of standard and standard plus low frequency). In any event the mode input is seen in the left hand lower portion of FIG. 4 as being inputted to the mode select circuit 80. Mode select circuitry is conventional and is combined with the step clock (STEPCK) signal to debounce and to enable the counters and switches as required therein to output the signals identified as $\overline{\phi LF}$, $\overline{LF\phi}$, $\overline{AMSTD}$, $\overline{\phi 1}$, $\overline{AMLF}$ and $\overline{23}$ (an unused signal). These signals are control lines and used to set up certain FET switches at the appropriate times during the display function of the test instrument.

An input threshold signal ($\overline{IMPTH}$) is applied to a circuit identified as input level select 81 that is again debounced by the step clock (STEPCK) signal and which later provides the three outputs IMPL+0, IMPL+4 and IMPL+8. As seen on FIG. 11, a push button switch is provided for the selection of the three threshold levels at which impulse noise spikes will be registered. An LED indicator associated with an impulse counter window identifies the selected threshold as zero, +4, or +8 and corresponds to thresholds that are 4 dB and 8 dB respectively above the reference level. These LED's also are illuminated (for 145 ms.) during the occurrence of a HIT associated with the indicated threshold.

A window detect in signal (WNDTIN) is inputted at the lower left hand corner of FIG. 4 into a buffer amplifier 82 and is fed therefrom to 4 level comparators 83, 84, 85 and 86. Each of these comparators are likewise fed a voltage reference shown as VT+6, VT+0.5, VT−0.5, and VT−20 respectively. In this manner comparator 83 outputs an input level of +6 dB, 84 is outputted at a level at +0.5 dB, 85 is outputted at a level of −0.5 dB and 86 is outputted at a level of −20 dB. These outputs are further respectively identified as $\overline{H2LED}$, $\overline{H1LED}$, $\overline{L1LED}$ and $\overline{L2LED}$ and are used to drive anyone of an associated group of four LEDs generally represented by the numeral 206 and shown as four darkened triangular windows adjacent the level potentiometer 203 on FIG. 11. These LEDs indicate the "location" of the input signal level with reference to the existing setting of this control. A correct input level is established by rotating the level potentiometer in the direction indicated by the LED "pointers" until all four LEDs are extinguished.

As mentioned above with respect to the A/D converter circuitry board shown in FIG. 4, an up count (UPCNT) is generated which is essentially a pulse train used to represent the phenomena being measured (either amplitude or phase modulation). This up count is inputted to the counter board (FIG. 5) and is initially directed to a two decade counter and latch circuit identified by the numeral 87. The output of the two decade counter is a BCD signal and identified as the output terminal UDA, UDB, UDC, UDD, UDAA, UDBB, UDCC and UDDD. Additionally the two decade latch circuit 87 has the inputs identified as transfer and clear (XFR and CLR respectively). Quite obviously the latch within circuit 87 transfers the data when a transfer signal occurs and the counters are cleared upon the reception of a clear signal.

Figure 5:
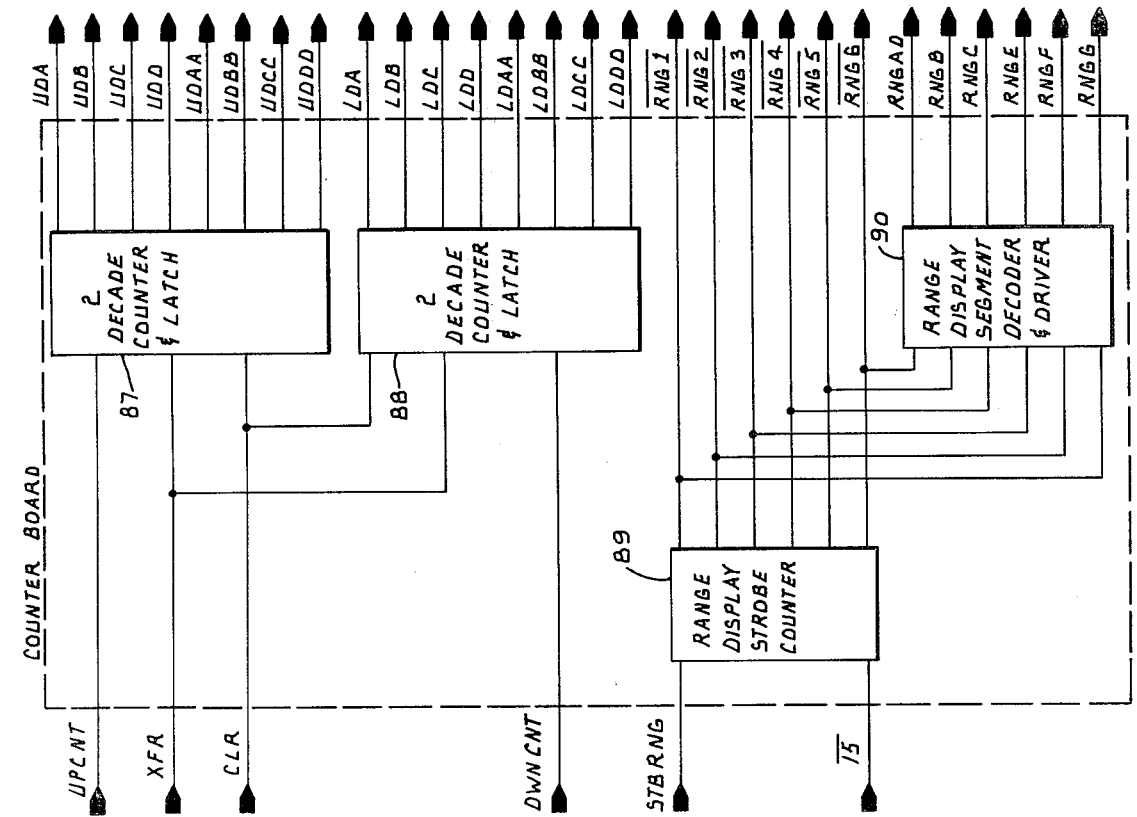
FIG. 5 is a block diagram of the counter circuit.

A second two decade counter 88 and latch receives the down count (DWNCNT) signal and operates in substantially the same fashion to drive the lower display of the bar graph appearing on the front panel of the instrument shown on FIG. 11. The output terminals shown on the right side of the counter board in FIG. 5 are designated as LDA, LDB, LDC, LDD, LDAA, LDBB, LDCC and LDDD.

A range display strobe counter 89 is located in the lower half of the counter board circuit and receives the strobe range (STB RNG) and the $\overline{15}$ signals. This circuit is basically comprised of a one of six counter which is used to enable certain ones of the 6 (six) range LEDs. Essentially circuit 89 corresponds to a strobe generator. The outputs of the strobe generator (89) are the terminals designated as $\overline{RNG\ 1}$, $\overline{RNG\ 2}$, $\overline{RNG\ 3}$, $\overline{RNG\ 4}$, $\overline{RNG\ 5}$ and $\overline{RNG\ 6}$. These same outputs are also delivered to a range display segment decoder and driver circuit 90 that operates to illuminate appropriate segments on the LEDs displayed on the front panel of the test instrument and has the following outputs therefrom: RNG AB, RNG B, RNG C, RNGE, RNG F and RNG G. The output(s) designations refer to bars of the 7 segment display thereon.

The hits circuit board is shown in FIG. 6. A crystal oscillator schematically shown as 91 with an associated inverter 92 is shown in the upper right hand corner of the hits board and combines to provide a timing generator capable of producing a 1 MHz output that is associated with the above mentioned A/D converter circuitry.

A pulse stretching and priority setting circuit 93 is shown in the middle of FIG. 6 and is essentially there to establish a hierarchy set up by the Bell System Specification which calls for a "drop out" to have the highest rank and to disable all subsequent lower priority counts. Next in line are phase hits and gain hits which have equal ranking and even though they are disabled by drop out, they disable an impulse count. The lowest priority is impulse hits which are disabled if any other of the above mentioned counts occur. Additionally the circuitry associated therein will have a 4 millisecond definition that will require a phase hit, gain hit or drop out to have occurred for at least 4 milliseconds and conversely an impulse hit by definition will last less than 4 milliseconds. For timing purposes, the outputs from the pulse stretching and priority setting circuitry are defined as no faster than 7 output events per second. This circuitry has been defined in the Halcyon product 520B-2 "Universal Test System" and more particularly in the Halcyon Maintenance Practice Manual MP 520-01 printed November, 1977, drawing No. SD1038-00.

The inputs to the pulse stretching and priority circuitry 93 include the drop out count ($\overline{DRPOT}$), phase hit in ($\phi HITIN$), and phase hit reference ($\phi HITREF$). The phase hit in comes from the phase jitter board (FIG. 2) which is the rectified standard phase modulation signal and which is fed into comparator 94 with the other input thereto being the DC level phase hit reference which is generated by the thumb wheel setting shown in FIG. 11 and on the front panel of the subject instrument. The output from the comparator goes into the pulse stretching and priority setting circuit 93. The next input to the hits board is the gain hit in (GHITIN) which comes from the AM jitter board and which is fed to two comparators 95 and 96. Comparator 95 likewise receives an input in the form of a plus gain hit reference (+GHTREF) also generated by the thumb wheel switches on the face panel. Comparator 96 receives the reference minus gain hit reference (−GHTREF) and is also generated by the thumb wheel switches. However, the minus gain hit reference goes to amplifier 97 which has a gain of +0.7 since the associated AGC system does not have the same absolute level for plus and minus gain hits, for example, a +3 dB and −3 dB represents a nonlinear relationship. In any event, the outputs from the comparators 95 and 96 are fed into the priority setting arrangement portion of the circuitry in block 93.

An impulse hit reference (IHTREF) also generated by the thumb wheel is delivered to the hits board and further fed to three parallel comparators designated by the numerals 98, 99 and 100. The other input to these comparators is the impulse noise (IMPNOS) from the receiver board which goes directly to comparator 98 and which is further divided by an appropriate resistor circuit to feed into comparator 99 at a level of −4 dB relative to the level of 98 and at a level of −8 dB relative to the 98 level is fed into comparator 100. The later two comparators provide for the +4 and +8 levels relative to zero for the impulse count.

The outputs for the priority setting system (circuit 93) are the drop out count (DOCNT), drop out LED (DOLED) which is used to light the LED's on the front panel (FIG. 11), phase hit count ($\phi$HTCNT), phase hit LED ($\phi$HLED) which illuminates the front panel LED, gain hit count ($\overline{\text{GHTCNT}}$) and gain hit LED ($\overline{\text{GHTLED}}$) which illuminates the gain hit LED on the front panel, impulse count (INTCNT) which is impulse plus zero and which is merely referred to as "impulse," impulse hit plus 4 count (IH+4 CT) and impulse hit plus 8 count (IH+8 CT). (As with the impulse LEDs mentioned above, these LEDs are illuminated for 145 ms. except for drop outs which cause their respective LEDs to be on for a longer duration of same or 145 ms whichever is greater.) All of these counts go to the events counter circuit board. The impulse plus 0+4 and +8 counts are taken down into a series of NOR-gates which are 101, 102 and 103 respectively. These NOR-gates also receive signals on the lower left hand corner of FIG. 6 designated as IMPL+0 which are inverted by inverter 104 and directed into the NOR-gate 101. This permits an LED to be flashed even though the front panel is displaying the +4 count.

Similarly, an input designated as IMPL+4 is inverted by an inverter 105 and applied to the NOR-gate 102. The input impulse plus 8 (IMPL+8) is inverted by inverter 106 and applied to the NOR-gate 103. In this manner the same mode of operation exists with respect to all three impulse counts.

Turning now more particularly to the events counter circuit board shown in FIG. 7, an internal timing generator 107 is utilized to receive signals indicated as $\overline{\text{CONT}}$ (continuous), 5 MIN (5 minutes) and 1 MHz (1 megahertz). This arrangement of three input signals sets up one pulse per minute counter which is then compared to the 5 or 15 minute stop intervals or continuous signal and set up the window that allows the counter to operate only during timing select. In any event the internal timing generator produces one output identified as gate count (GATECT) which is a signal which goes high to enable counters at times when hits are being counted. A minute count (MINCNT) is also outputted from the internal timing generator which is used to generate a count on the front panel display which informs the operator how many minutes have elapsed since the hits have started to be counted.

The final input to the internal timing generator 107 is called reset count ($\overline{\text{RSTCNT}}$) which emanates from a front panel push button switch and which clears the timing generator and minute counter and all the remainder of the hit counters. This signal initiates the hit timing period e.g. generates the start with the hit counting.

The scan generator 108 has as its input the 1 MHz signal and is utilized to strobe the counters in that all the hit counters are multiplexed and since there are five counters, each with three digits on the display, each counter is enabled once during each operation (or 1/15 of the on time) and is strobed four time during each enable period. The output from the scan generator is of course delivered to the counters and output drivers circuit 109 which has other inputs including the phase hit count ($\phi$ HTCNT), gain hit count (GHTCNT), drop out count (DRCNT). Additionally, the impulse count and impulse count plus zero are OR'd together in the OR-gate 110 and applied to the circuit 109 while other inputs including 1H+4CT is OR'd with $\overline{\text{IMPL+4}}$ at OR-gate 111 and 1M+8CT is OR'd with $\overline{\text{IMPL+8}}$ at OR-gate 112 before being applied to the counters and output driver 109. The ORing is to permit the display of only one of the three hits. The output of the counter and driver blocks are 15 digit enables are from top to bottom $\phi$ HTMSD to SD-LSD which are the phase hit most significant digit, second significant digit and least significant digit. The same applies for the gain hits which are designated as DOT, minute counter designated as MIN and impulse hit which is designated as IHT. Also the counter and output drivers circuit 109 outputs the 7 segment line for the strobed LEDs and include the level LED A through G. (See the right hand portion of FIG. 7).

Turning now to the combined front panel display circuit board (FIG. 8) and the associated elevational view of the front panel (FIG. 11), it is noted that the hits display designated by the numeral 113 is comprised of 15 LED 7 segment devices that are used to display the hit counts. This display has as its input the level A through level G, $\overline{\text{MINLSD}}$, $\overline{\text{MINSSD}}$, $\overline{\text{MINMSD}}$, $\overline{\text{DOTLSD}}$, $\overline{\text{DOTSSD}}$, $\overline{\text{DOTMSD}}$, $\overline{\phi\text{HTLSD}}$, $\overline{\phi\text{HTSSD}}$, $\overline{\phi\text{MSD}}$, $\overline{\text{GHTLSD}}$, $\overline{\text{GHTSSD}}$, $\overline{\text{GHTMSD}}$, $\overline{\text{IHTLSD}}$, $\overline{\text{IHTSSD}}$, $\overline{\text{IHTMSD}}$, $\overline{\text{TIMLED}}$, $\overline{\text{DOLED}}$, $\overline{\phi\text{LED}}$, $\overline{\text{IM+OLD}}$, $\overline{\text{IM+4LD}}$, $\overline{\text{IM+8LD}}$. These inputs are the seven signals for the seven segment drivers, the 15 digit enables, and also the LEDS to be illuminated with a hit in that particular time, (a drop out LED, phase, gain and three impulse levels), and the time LED which will likewise indicate if the unit is in a hit mode by flashing. The circuit block 114 is entitled bar graph nomenclature and is utilized to illuminate the legends around the bar graph so as to tell the operator if the bar graph is depicting standard or standard plus low frequency mode, phase or amplitude jitter and whether in percent or degrees. The inputs to this circuitry are the $\overline{\text{AMSTD}}$, $\overline{\text{AMLF}}$, $\overline{\phi\text{LF}}$, $\overline{\text{LF}\phi}$ and $\overline{\phi\text{I}}$.

Figure 10A:
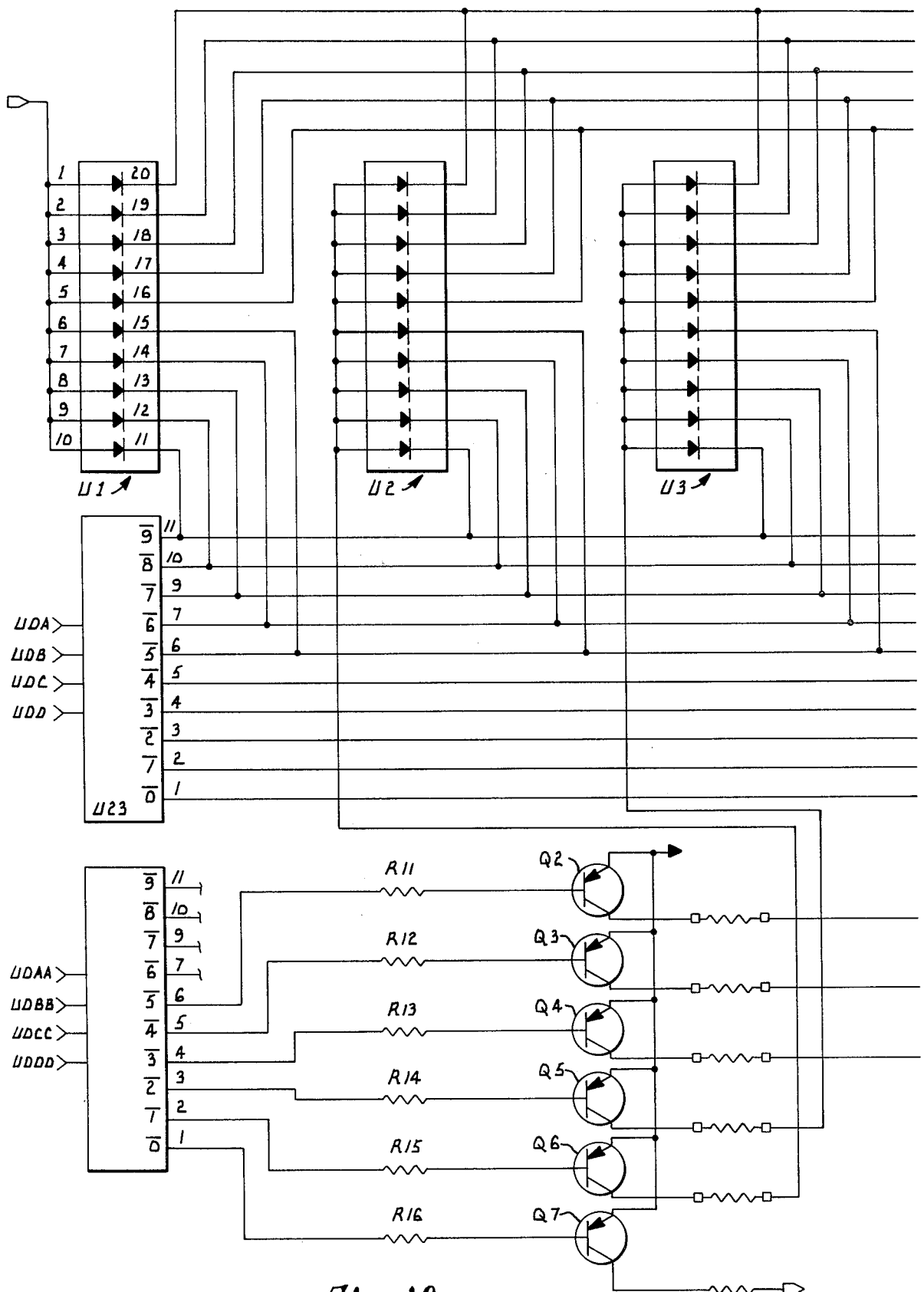
FIGS. 10a and 10b are schematic diagrams of upper bar graph display circuit, same being identical to the lower bar graph display circuit.
Figure 10B:
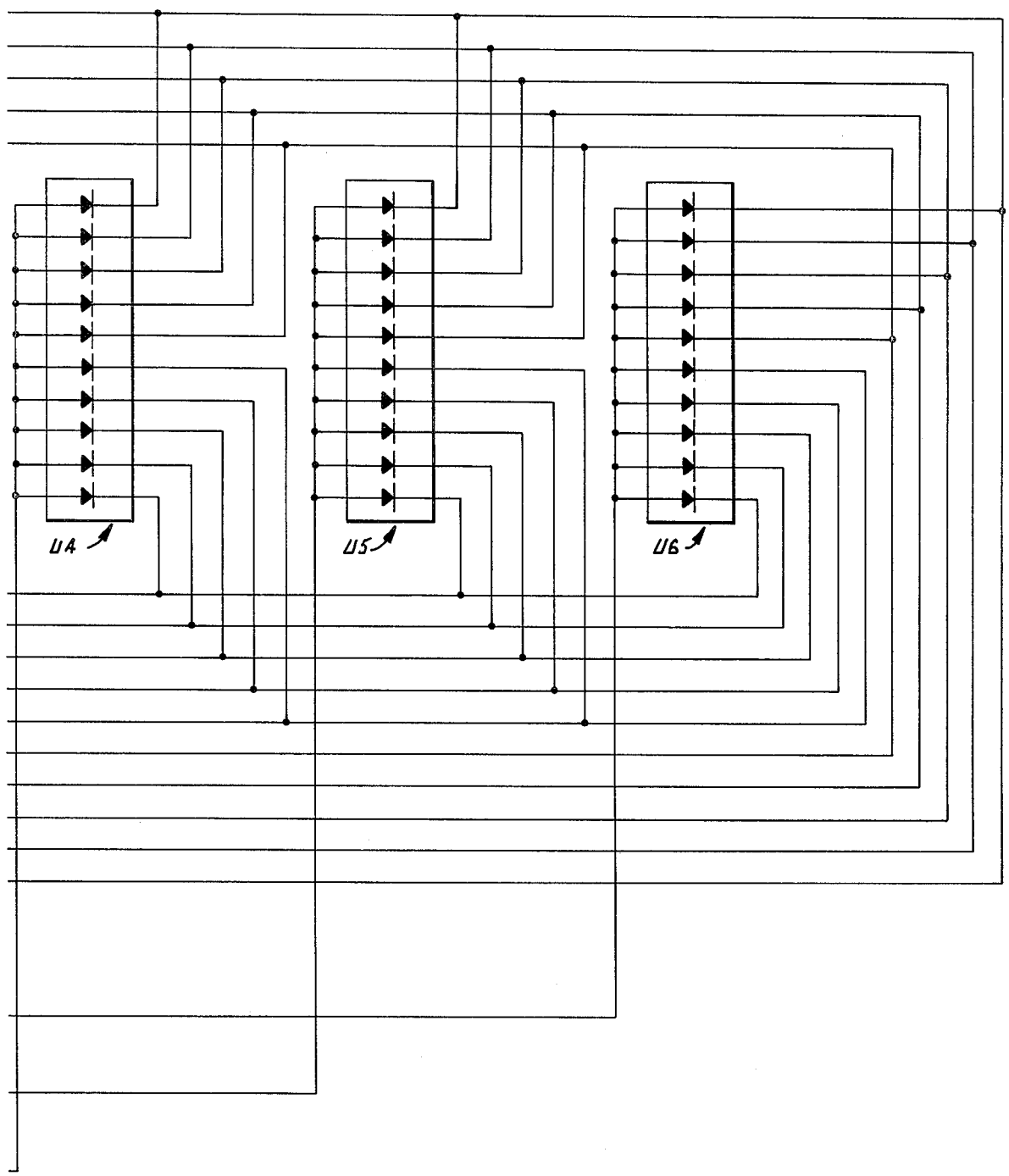
Figure 12:
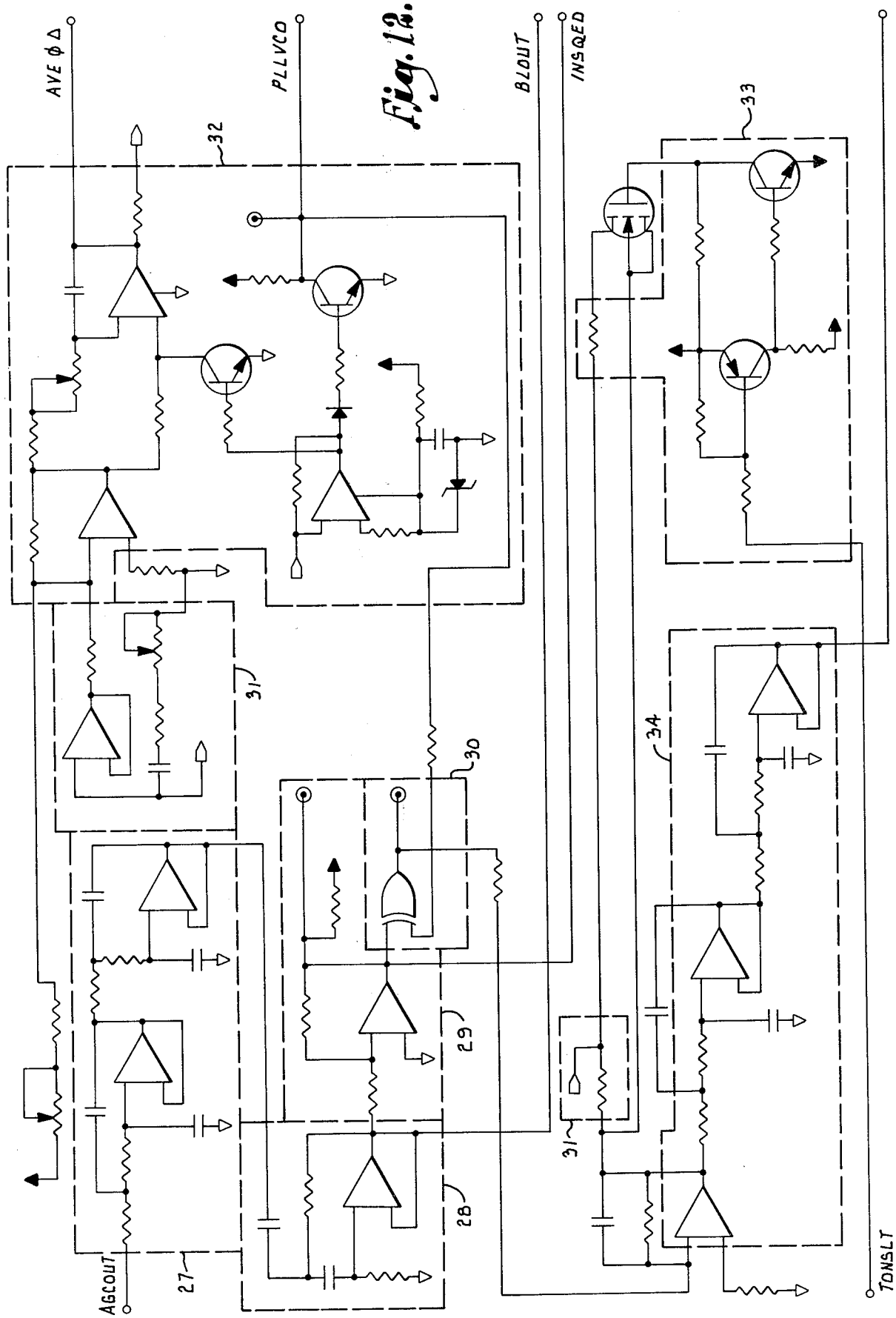
FIG. 12 is a more detailed schematic of portions of the phase jitter circuit shown in FIG. 2.

The upper bar graph display is indicated by the number 115 and has inputs thereto including UDA, UDB, UDC, UDD, UDAA, UDBB, UDCC, and UDDD. FIGS. 10a and 10b represent a more detailed schematic of the upper bar graph (as well as identical circuit for the lower bar graph 116). The circuitry includes a BCD to decimal decoder U23 which has inputs UDA, UDB, UDC, and UDD thereto that are in BCD. This decoder operates to decode the BCD number into the 10 decimal lines. These lines are used to enable the cathodes of all the six bar graphs (U1 through U6). For example $\overline{0}$ on U23 is 1 which connects with pin 20 on all six bar graphs U1, U2, U3, U4, U5 and U6.

The second counter is identified U22 and has the inputs UDAA, UDBB, UDCC, and UDDD thereto. The decimal decoder operates to decode and to use the lines numbered 1 through 6 and to use the resistor R11 through R16 and transistors Q2 through Q7 to the appropriate anodes of the six bar graph LEDs. If for example a numerical signal 15 was required the BCD code 5 would appear on the UDA through UDD input and a BCD code 1 would appear on the UDAA through UDDD inputs. These decode through lines to the diode matrix to illuminate the appropriate LED.

The range display is indicated by the number 117. This is a 7 segment display used to tell the instrument operator what bar graph range the instrument is currently displaying. It has inputs of range AD, B, C, E, F and G as well as range 1 through range 6 that is the standard strobed range (see FIGS. 5 and 8).

Figure 8:
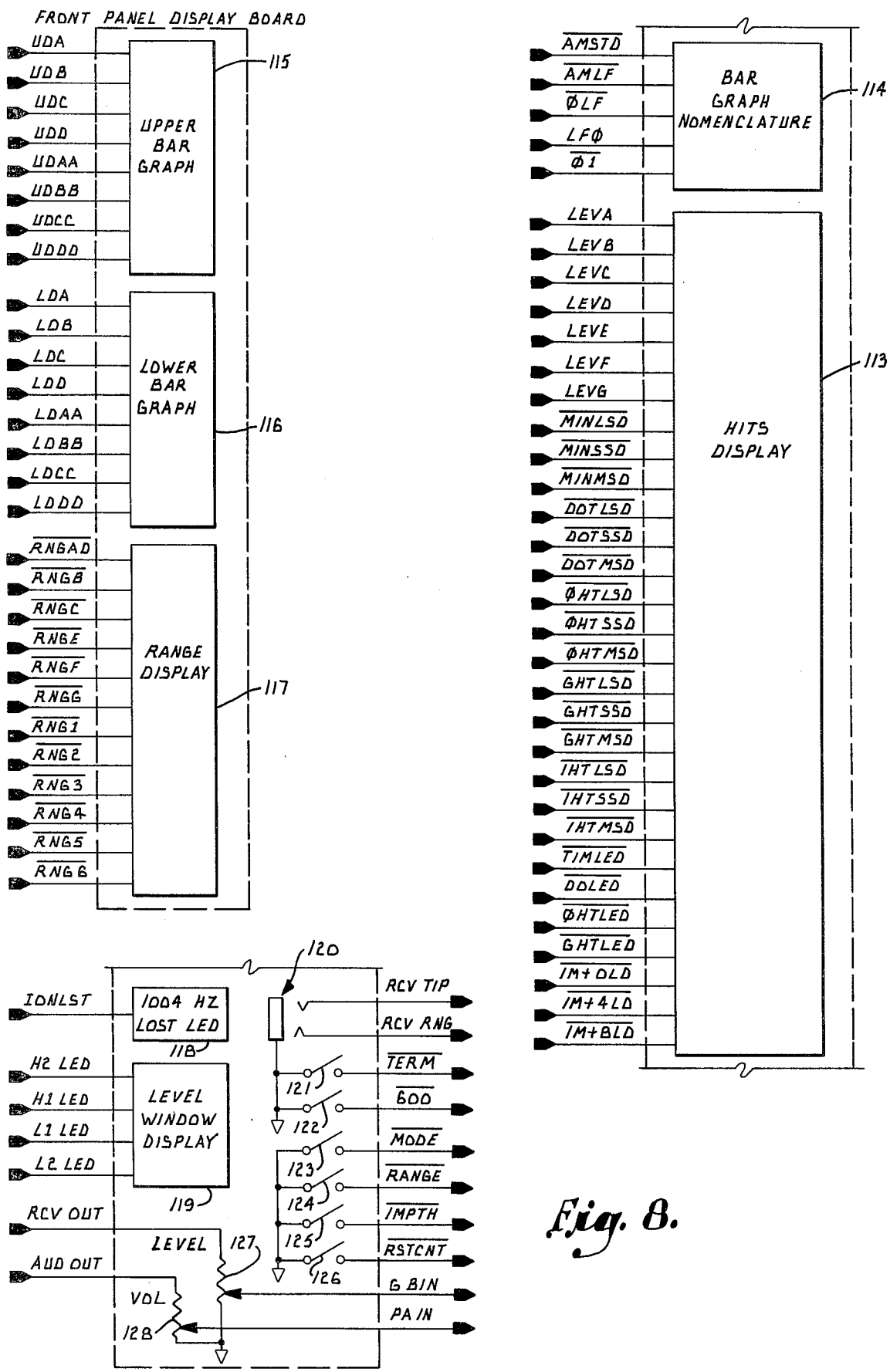
FIG. 8 is a block diagram of the front panel display and associated inputs thereto.

The 1004 Hz lost LED is shown in the lower left hand portion of FIG. 8 and identified by the numeral 118. This LED is enabled by the tone lost (TONLST) signal from the AM jitter board. It lights three LEDs on the front panel and tells the operator that the 1004 Hz signal is lost which disables the tone normally associated with the speaker informing the operator that the phase and amplitude readings have no meaning.

The level window display is indicated by the numeral 119 and has the inputs thereto of H2LED, H1LED, L1LED and L2LED. These LEDs schematically represent the triangular bi-level potentiometer operated indicators telling the operator if the level is above or below zero dB level. As mentioned above, the operator can adjust the appropriate potentiometer so that all 4 LEDs are extinguished thereby indicating the correct setting.

The input jack is again schematically shown at the numeral 120 corresponding to the received tip and range. Directly below same are the two switches 121 and 122 which are the term and the 600 ohm switches used for impedance weighting on the receiver. The final 4 switches 123, 124, 215 and 126 are push button switches used to change the following respective functions, mode, range impulse level displayed, (+0, +4, +8) and to reset the hit counter. The two potentiometers 127 and 128 are the level potentiometer and the volume potentiometer, respectively.

The integration thumb wheel board is schematically shown in FIG. 9. The inputs to FIG. 9 include a −V reference, +V reference, +9 volts, −9 volts and circuit ground. The circuit block 129 schematically shows the thumb wheel switches that are used to set DC levels through effecting feedback in the appropriate (input) resistors and related amplifiers. These DC levels are used for phase hit reference, plus or minus gain hit reference shown on the outputs thereof. Additionally, simple digital switches set up the impulse outputs impulse A (IMPULA), impulse B (IMPULB) and impulse D (IMPULD) which are used to control the gain on the audio receive circuit of the receiver board as well as the five minute (5MIN) and continuous (CONT) signals for the counters and the DC level for the impulse hit reference (IHTREF).

A conventional power supply unit is associated with the instrument which provides for the various system level power supplies as well as digital and analog ground.

Turning now more particularly to FIG. 11 (and in conjunction with the circuitry described above), the following will describe the operating controls, indicators and connectors thereto.

Numeral 211 is used to depict that portion of the front panel (FIG. 11) locating the indicating lights for the 1004 Hz lost indication. When a holding tone within the range of 1004 plus or minus 65 Hz is not detected by the input measuring circuitry, the indicating lights will so illuminate the numbers and word "1004 Hz lost" and all measurements are invalid while this indicator is illuminated.

The mode indicators 212 show the current operating configuration as selected by the mode switch 226. As mentioned above there are three operating modes and associated indicator configurations. For example, mode 1 which is a comparison of phase jitter (degrees) and amplitude jitter (equivalent degrees) both on standard plus LF will illuminate the following indicators:
Upper Display-phase-STD-+LF;
Middle Display-DEG; and
Lower Display-AMP-STD-+LF.
Mode 2 which will be an indication of phase jitter and degrees, peak-to-peak (a comparison of standard and standard plus LF) will have the mode indicators on as follows:
Upper Display Phase-STD
Middle Display DEG; and
Lower Display Phase-STD-+LF.
Mode 3 which indicates amplitude jitter and percent modulation (a comparison of standard and standard plus LF) will have the mode indicators illustrated as follows:
Upper Display AMP-STD;
Middle Display %; and
Lower Display AMP-STD-+LF.

The upper and lower linear displays are shown by the numbers 213a and 213b respectively. Phase and amplitude jitter components are measured on the two linear bar-chart displays. Each of the displays will be comprised of 60 miniature LEDs, with separate analog digital analog-to-digital circuits used to drive each of the displays. These display circuits are designed to provide the effect of continuous or sequential illumination on all adjacent LEDs encompassing the range of fluctuations from the jitter detector. As described with respect to FIGS. 10a, 10b and FIG. 8, the associated circuitry will insure activation of only a single LED for a given steady state output from the detector.

Since there is no inertia in the displays, the dynamics of a varying signal permit a quick glance by the operator to show the excursion range of the signal as well as the center of the range without losing any dynamic information sought.

Display ranges of 15 or 30 degrees (%) full scale are selected by means of the range switch 214 located in between the upper and lower display are windows 227 which are capable of front displaying the range increments therein. It should be noted that with 60 LEDs in each of the upper and lower linear displays (213a and 213b), the 15 degree (percent) range provides for a resolution of 0.25 and the 30 degree (percent) range provides for a resolution of 0.5.

The range push button alternately selects a 15 or 30 degree (percent) full scale range for the linear displays.

Reset push buttons switch 215 resets the time and hit counter displays 215 to zero and initiates a new counting sequence for measuring the transient events.

Volume control 216 establishes a comfortable listening level for the operator when monitoring the line for noise, single frequency interference, cross-talk, phase hits, gain hits or impulse noise.

As previously selected, the toggle switch 204 controls the application of primary power to the test instrument.

A TH level push button switch 205 selects the threshold level at which input noise spikes will be registered. An LED indicator within the impulse counter window identifies the selected threshold as zero, +4, or +8. The zero (reference) threshold is established by the impulse threshold switch generally indicated by the numeral 119. The plus 4 and plus 8 thresholds are 4dB and 8dB, respectively, above the reference level. The thresholds for phase hits, gain hits and impulse noise are controlled by three sets of digital thumb wheel switches 119. The threshold for the drop out parameter is automatically set by internal circuitry to a value of 12dB below the incoming 1004 Hz holding tone level set to 0dB by pot 203. The length of the test period is controlled by the three position thumb wheel switch (time) which activates the counter registers for either a 5 or 15 minute test period, or enables the counting circuits on a continuous basis. The term/bridge switch 202, the 600/900 ohm switch 201 and the input jack 200 have been described above as well as the level potentiometer 203 and the 4 triangular window LEDs 206.

As suggested above, three digit numerical display modules are provided for each of the hit functions (drop out, phase hits, gain hits and input noise) and for the test timer. These display modules are generally represented by the numeral 225 and all (except impulse noise) are driven by dedicated event counting registers. The impulse noise display is driven by any of three switch-selectable registers to indicate count totals for the reference threshold (zero) or for the plus 4 or plus 8 thresholds. The push button switch 205 determines which of these registers is selected for application to the display. Three LED indicators, located at the bottom of the display, identify which of the three registers is currently being displayed. The LED for the selected register assumes a "steady on" state. The two other "dark" LEDs are momentarily "flashed" for each hit entry to show count activity. All displays are reset to a count of zero and a new test sequence is initiated when the reset switch 215 is depressed.

The mode push button switch 226 operates to sequentially advance the test instrument through the various operating configurations described above while the range indicators in the windows identified as 227 display the selected range values for the jitter displays. Once the preliminary procedures including connection with the power source and setting the power switch etc. have been accomplished, the test instrument is ready for operation. Upon "power up" the configuration is as follows:

Upper Display Phase-STD+LF;
Middle Display % (degree); and
Lower Display AMP-STD+LF.

The range switch 214 is impressed to select a full scale range of 15 or 30 degrees as registered on the indicators 227. The higher range may be required to monitor peak excursions of hit functions or, if jitter levels exceed 15 degrees. The lower range provides increased resolution for close analysis, a difference between low-level jitter components. The bar chart upper and lower displays 213a and 213b may then be analyzed for noise levels (approximately equally readings) or the presence of incidental jitter components (difference between readings). Likewise, the audio output may be monitored for single-tone interference, cross-talk or transient hits.

In the mode just described, the basis for both readings is standard plus low frequency. Thus all jitter components in the 4–300 Hz range were measured. Phase jitter is displayed in degrees (peak-to-peak) on the upper display 213a and amplitude jitter is displayed in "equivalent degrees" on the lower display 213b.

A second mode of operation is a comparison of phase jitter, standard versus plus LF and in such a mode both displays indicate phase jitter in degrees peak-to-peak. The upper display 213a shows standard phase jitter and the lower display shows standard plus low frequency. The standard plus low frequency reading includes all components in the "standard" reading plus any components between 4 Hz and 20 Hz. Thus, when the two readings are approximately equal, there is no substantial low frequency components. Significant low frequency components are present when the standard plus low frequency reading is higher than the standard reading.

The above operating mode is obtained by depressing the mode switch 216 to obtain the following display configuration:

Upper Display Phase-Standard;
Middle Display %; and
Lower Display Phase-STD-+LF.

In such a mode significant differences between the two readings are due to the presence of low frequency phase jitter components.

The third mode of operation includes comparison of amplitude jitter, standard versus standard plus LF. In this mode both displays indicate amplitude jitter with notation shown as percent amplitude modulation. The relationship between standard and standard plus low frequency is the same as for phase jitter. To set the instrument in this particular mode, the mode switch 216 is depressed to obtain the following display configuration:

Upper Display AMP-STD;
Middle Display %; and
Lower Display AMP-STD-+LF.

By observing the upper and lower displays 213a and 213b any significant differences between the two readings are due to low frequency amplitude jitter components.

Finally, the hits measurements permit the simultaneous counting of phase hits, gain hits, drop outs and three levels of input noise. Transient hit functions are measured and recorded by setting the thumb wheel switches 219 to specified thresholds per applicable practice for specified requirements. Then depress the threshold level switch 205 to select the reference level (zero, +4, or +8 dB). An appropriate LED indicator within the display module will light to identify the selected threshold. The time thumb wheel switch (219) may then be set to the test period required (5 minutes, 15 minutes or continuous). Reset switch 215 is provided to clear the displays and initiate further tests. Finally, an LED indicator in the time window (225) will flash continuously to show that the test is in progress and will assume a steady state off condition signifying that the test has been completed per the selected time.

From the foregoing, it will be seen that this invention is one well adapted to attain all ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention we claim:

1. An apparatus for evaluating impairments affecting voiceband data transmission including phase and amplitude jitter, said apparatus including
   means for receiving a test tone capable of having data affecting impairments thereon,
   means for detecting said impairments on said received test tone,
   means for producing a digital representation of said impairments,
   means for displaying phase jitter in a linear digital display, and
   means for simultaneously displaying amplitude jitter in a separate and independent linear digital display, both of said displaying means being in visual proximity with each other.

2. The apparatus as in claim 1 wherein said linear display is comprised of a plurality of discrete illuminatable means arranged in a linear pattern.

3. The apparatus as in claim 2 including circuit means for selectively illuminating certain ones of said discrete illuminatable means in accordance with the detected jitter on said test tone.

4. The apparatus as in claim 1 including means for simultaneously counting transient events.

5. The apparatus as in claim 4 wherein said transient events includes phase hits, gain hits, drop outs and impulse hits.

6. The apparatus as in claim 5 including means for providing a threshold for phase hits.

7. The apparatus as in claim 6 including means for providing a threshold for gain hits.

8. The apparatus as in claim 7 including means for establishing a fixed drop out threshold.

9. The apparatus as in claim 4 including means for establishing a threshold for said phase hits, gain hits and drop outs.

10. The apparatus as in claim 1 including means for aurally monitoring impairments on said test tone.

11. The apparatus as in claim 4 including means for aurally monitoring said transient events.

12. The apparatus as in claim 1 including means for interconnecting said apparatus with the X and Y deflections of an oscilloscope to display impairments in the phasor domain.

13. The apparatus as in claim 1 wherein each said display means is comprised of a linear digital display, said linear digital display having a plurality of discrete illuminatable means arranged in a linear pattern,
    a circuit means for selectively illuminating certain ones of said discrete illuminating means in accordance with the detected amounts of jitter on said test tone,
    means for simultaneously counting transient events including phase hits, gain hits and drop outs, and
    means for aurally monitoring phase hits, gain hits and drop outs as impairments on said test tone.

14. An apparatus for evaluating impairments affecting voiceband data transmission including standard phase jitter and standard plus low frequency phase jitter, said apparatus including
    means for receiving a test tone capable of having data affecting impairments thereon,
    means for detecting impairments on said received test tone,
    means for producing a digital representation of said impairment,
    means for displaying standard phase jitter, in a linear digital display and
    means for simultaneously displaying standard plus low frequency phase jitter in a separate and independent linear digital display, both of said displaying means being in visual proximity with each other.

15. The apparatus as in claim 14 wherein said linear display is comprised of a plurality of discrete illuminatable means arranged in a linear pattern.

16. The apparatus as in claim 15 including circuit means for selectively illuminating certain ones of said discrete illuminatable means in accordance with the detected jitter on said test tone.

17. The apparatus as in claim 14 including means for simultaneously counting transient events.

18. The apparatus as in claim 17 wherein said transient events includes phase hits, gain hits, drop outs and impulse hits.

19. The apparatus as in claim 18 including means for providing a threshold for phase hits.

20. The apparatus as in claim 19 including means for providing a threshold for gain hits.

21. The apparatus as in claim 20 including means for establishing a fixed drop out threshold.

22. The apparatus as in claim 17 including means for establishing a threshold for said phase hits, gain hits and drop outs.

23. The apparatus as in claim 14 including means for aurally monitoring impairments on said test tone.

24. The apparatus as in claim 17 including means for aurally monitoring said transient events.

25. The apparatus as in claim 14 including means for interconnecting said apparatus with the X and Y deflections of an oscilloscope to display impairments in the phasor domain.

26. The apparatus as in claim 14 wherein each said display means is comprised of a linear digital display, said linear digital display having a plurality of discrete illuminatable means arranged in a linear pattern,
    a circuit means for selectively illuminating certain ones of said discrete illuminating means in accordance with the detected amounts of jitter on said test tone,
    means for simultaneously counting transient events including phase hits, gain hits and drop outs, and
    means for aurally monitoring phase hits, gain hits and drop outs as impairments on said test tone.

27. An apparatus for evaluating impairments affecting voiceband data transmission, said apparatus including
    means for receiving a test tone capable of having said data affecting impairments thereon,
    means for detecting said impairments on said test tone,
    means for producing a digital representation of said impairments,
    a mode 1 impairment display having means for displaying phase jitter, and separate means for simultaneously displaying amplitude jitter, both of said displaying means being in visual proximity with each other;
    a mode 2 impairment display, said mode 2 display having means for displaying standard phase jitter, and separate means for simultaneously displaying standard plus low frequency phase jitter, both of said displaying means being in visual proximity with each other, and
    a mode 3 impairment display, said mode 3 display including means for displaying standard amplitude jitter and separate means for simultaneously displaying standard plus low frequency jitter, and means for selectively displaying one of said mode 1, mode 2 and mode 3 displays.

28. The apparatus as in claim 27 wherein said display means is comprised of a linear display having a plurality of discrete illuminatable means arranged in linear pattern, and circuit means for selectively illuminating certain ones of said discrete illuminatable means in accordance with detected amounts of jitter on said tone.

29. The apparatus as in claim 28 including means for simultaneously counting transient events.

30. The apparatus as in claim 29 including means for aurally monitoring transient events impairments on said test tone.

31. The method of evaluating parameters affecting voiceband data transmission including jitter, said method including steps of receiving a test tone capable of having data affecting impairments thereon, displaying phase jitter, simultaneously displaying amplitude jitter, both of said displaying steps being accomplished in visual proximity with each other, causing each of said displaying steps to be accomplished in a linear pattern, and illuminating discrete portions of said pattern in accordance with detected amounts of jitter on said test tone.

32. The method as in claim 31 including the step of simultaneously counting transient events.

33. The method as in claim 32 including the step of aurally monitoring transient event impairments on said test tone.

34. The method for evaluating parameters affecting voice band data transmission including jitter, said method including the steps of displaying mode 1 jitter information on two separate simultaneously visible displays, one display having jitter and the other display having amplitude jitter thereon, displaying mode 2 jitter information on the same two separate simultaneously visible displays, one display having standard phase jitter thereon and the other display having standard plus low frequency phase jitter thereon, displaying mode 3 jitter information on the same two separate simultaneously visible displays, one display having standard amplitude jitter thereon and the other display having standard plus low frequency amplitude jitter thereon, and means for selectively displaying one of said mode 1 information, mode 2 information, and mode 3 information.

* * * * *